United States Patent [19]

Takeya

[11] Patent Number: 5,579,028
[45] Date of Patent: Nov. 26, 1996

[54] APPARATUS FOR MIXING PLAY VIDEO SIGNAL WITH GRAPHICS VIDEO SIGNAL

[75] Inventor: Noriyoshi Takeya, Tokorozawa, Japan

[73] Assignee: Pioneer Electronic Corporation, Tokyo, Japan

[21] Appl. No.: 69,360

[22] Filed: Jun. 1, 1993

[30] Foreign Application Priority Data

Jun. 3, 1992 [JP] Japan ................... 4-143040

[51] Int. Cl.⁶ ................. G09G 5/00; H04N 9/74
[52] U.S. Cl. .................. 345/115; 345/213; 348/584
[58] Field of Search .............. 345/113–118, 199, 345/213; 348/584–598; H04N 9/74

[56] References Cited

U.S. PATENT DOCUMENTS

| | | | |
|---|---|---|---|
| 4,599,611 | 7/1986 | Bowker et al. | 348/589 |
| 4,675,737 | 6/1987 | Fujino et al. | 348/589 |
| 4,698,666 | 10/1987 | Lake, Jr. et al. | 348/584 |
| 4,827,344 | 5/1989 | Astle et al. | 348/586 |
| 4,891,705 | 1/1990 | Suzuki et al. | 345/115 |
| 4,899,139 | 2/1990 | Ishimochi et al. | 345/115 |
| 4,935,815 | 6/1990 | Ichikawa et al. | 348/594 |
| 5,038,300 | 8/1991 | Seiler et al. | 345/199 |
| 5,065,143 | 11/1991 | Greaves et al. | 348/590 |

*Primary Examiner*—Steven Saras
*Attorney, Agent, or Firm*—Sughrue, Mion, Zinn, Macpeak & Seas

[57] ABSTRACT

An apparatus for mixing a play video signal derived by playing a recording medium with a graphics video signal derived on the basis of data processing. A video selecting signal generated on the basis of image data is delayed, where its delay time is adjustable. By issuing image data for testing, the delay time is manually or automatically adjusted so as to coincide a time at which the video image selecting signal is generated on the basis of the image data for testing with a time at which the image data for testing is converted to a graphics video signal and issued.

1 Claim, 10 Drawing Sheets

Fig. 3

| SCREEN | VD8 | VD7 | VD6 | VD5 | VD4 | VD3 | VD2 | VD1 | VD0 |
|--------|-----|-----|-----|-----|-----|-----|-----|-----|-----|
| A | 1 | X | X | X | X | X | X | X | X |
| B | 0 | X | X | X | X | X | X | X | X |
| C | 0 | 0 | 0 | 0 | 0 | 0 | 0 | 0 | 0 |

Fig. 4

| P1 | P0 | PRIORITY DISPLAY ORDER |
|----|----|------------------------|
| 0 | 0 | D > A > B > C |
| 0 | 1 | A > D > B < C |
| 1 | 0 | A > B > D > C |
| 1 | 1 | A > B > C > D |

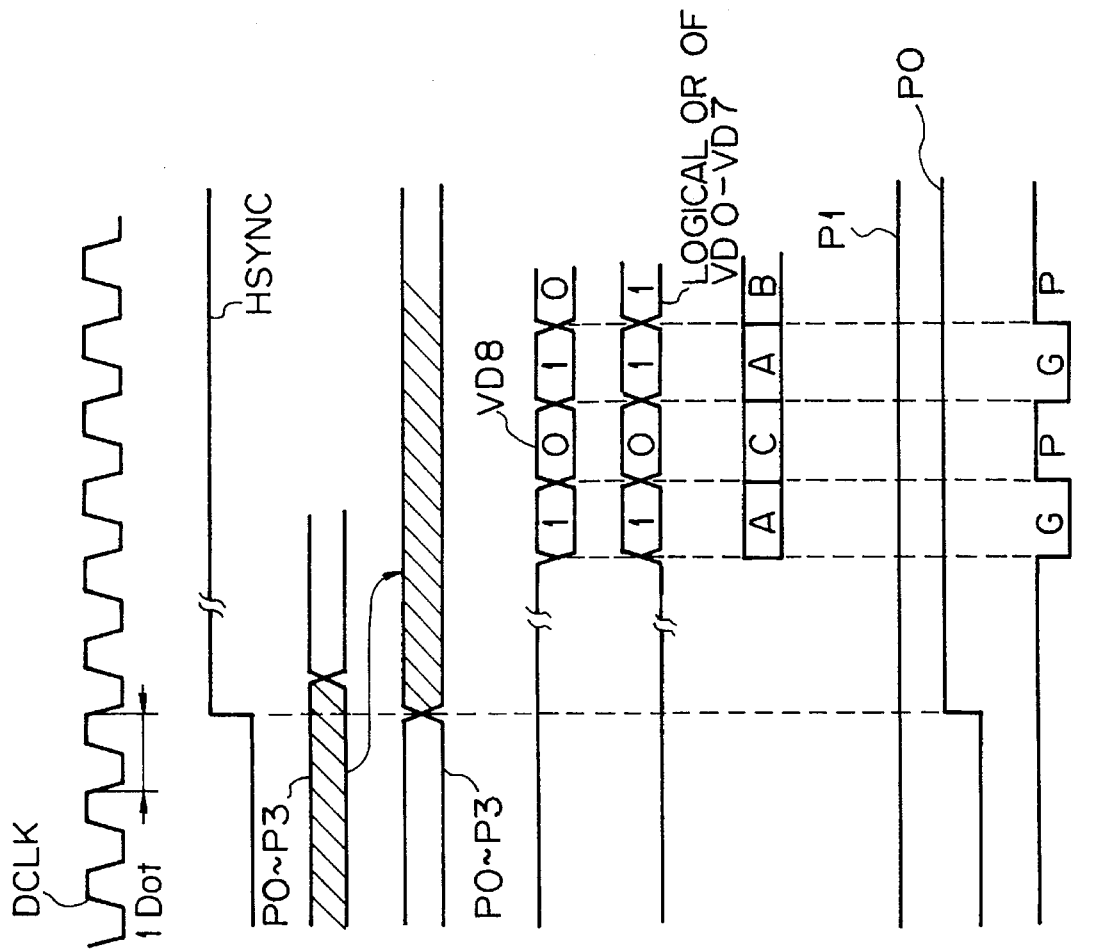

APPARATUS FOR MIXING PLAY VIDEO SIGNAL WITH GRAPHICS VIDEO SIGNAL

BACKGROUND OF THE INVENTION

1. Field of the Invention

The present invention relates to an apparatus for mixing a play video signal generated by playing a recording medium with a graphics video signal generated on the basis of data processing.

2. Description of the Related Background Art

In video equipment such as a video game machine employing graphics video images, for example as disclosed in Japanese Patent Application Kokai No. 64-78319, data such as character data stored in V-RAM is read in accordance with a program, image data is generated on dot-by-dot basis, in accordance with the read data, and the image data is supplied to an encoder to be converted to RGB data indicative of a corresponding color tone in a color table. Further, the RGB data is converted to an analog RGB signal from which a composite video signal is created and used as a graphics video signal.

In such video equipment, it is thought to mix a graphics video signal generated as described above with a play video signal representative of a moving image or a still image produced by playing a recording medium such as a video disc in order to create various video images. In this case, determination is made as to the kind of an image produced by image data, for example, whether the data represents a character portion such as a person or data for producing a background portion, and one of the play video signal and the graphics video signal is selectively issued in accordance with the determination result.

However, after the image data is produced, a time necessary for the encoder to generate a graphics video signal for the image data is different from a time necessary to select a kind of image, thereby failing to superimpose a graphics video image produced by the graphics video signal with a play video image produced by the play video signal at a desired position on the screen. For example, when a play video image P is to be inserted in a circular form in a graphics video image G, as shown in FIG. 1, the play video image P may be actually inserted at a position indicated by a solid line which is different from a desired position indicated by a broken line, whereby a hatched portion, which should be hidden by the play video image, may appear as a graphic video image, and the video image P is displayed at a displaced position, thus presenting an undesired video image.

SUMMARY OF THE INVENTION

It is therefore an object of the present invention to provide an apparatus for mixing a play video signal with a graphics video signal which is capable of appropriately positioning a graphics video image and a play video image which are to be mingled in a screen.

According to the present invention, the apparatus for mixing a play video signal derived by playing a recording medium with a graphics video signal derived on the basis of the results of processing performed by data processing means, comprises: data output means for issuing image data in pixel-by-pixel basis; converting means for converting image data issued from the data output means to the graphics video signal; video image discriminating means for discriminating, based on the image data issued from the data output means, which of a video image represented by the play video signal and a video image represented by the graphics video signal is to be displayed and for generating a video image selecting signal indicative of the determination result; delay means for delaying the video image selecting signal; and mixing means for mixing the play video signal with the graphics video signal in accordance with the video image selecting signal issued from the delay means, wherein the delay means is adjustable to provide a desired delay time.

In the apparatus of the present invention, the video image selecting signal generated on the basis of image data issued from the data output means is delayed by the delay means, the delay time of which is adjustable. Therefore, by issuing image data for testing from the data output means, the delay time provided by the delay means can be manually or automatically adjusted so as to coincide a time at which the video image selecting signal is generated on the basis of the image data for testing with a time at which the image data for testing is converted to a graphics video signal and issued from the converting means.

BRIEF DESCRIPTION OF THE DRAWINGS

FIG. 3 shows the contents of image data VD0 - VD7 for screens A–C;

FIG. 4 shows the priority display order corresponding to priority data P0, P1;

FIGS. 7(a)–7(j) show the operating states of respective portions in the apparatus of FIG. 2;

DESCRIPTION OF THE PREFERRED EMBODIMENTS

Embodiments of the present invention will hereinafter be explained in detail with reference to the accompanying drawings.

Figure 2:
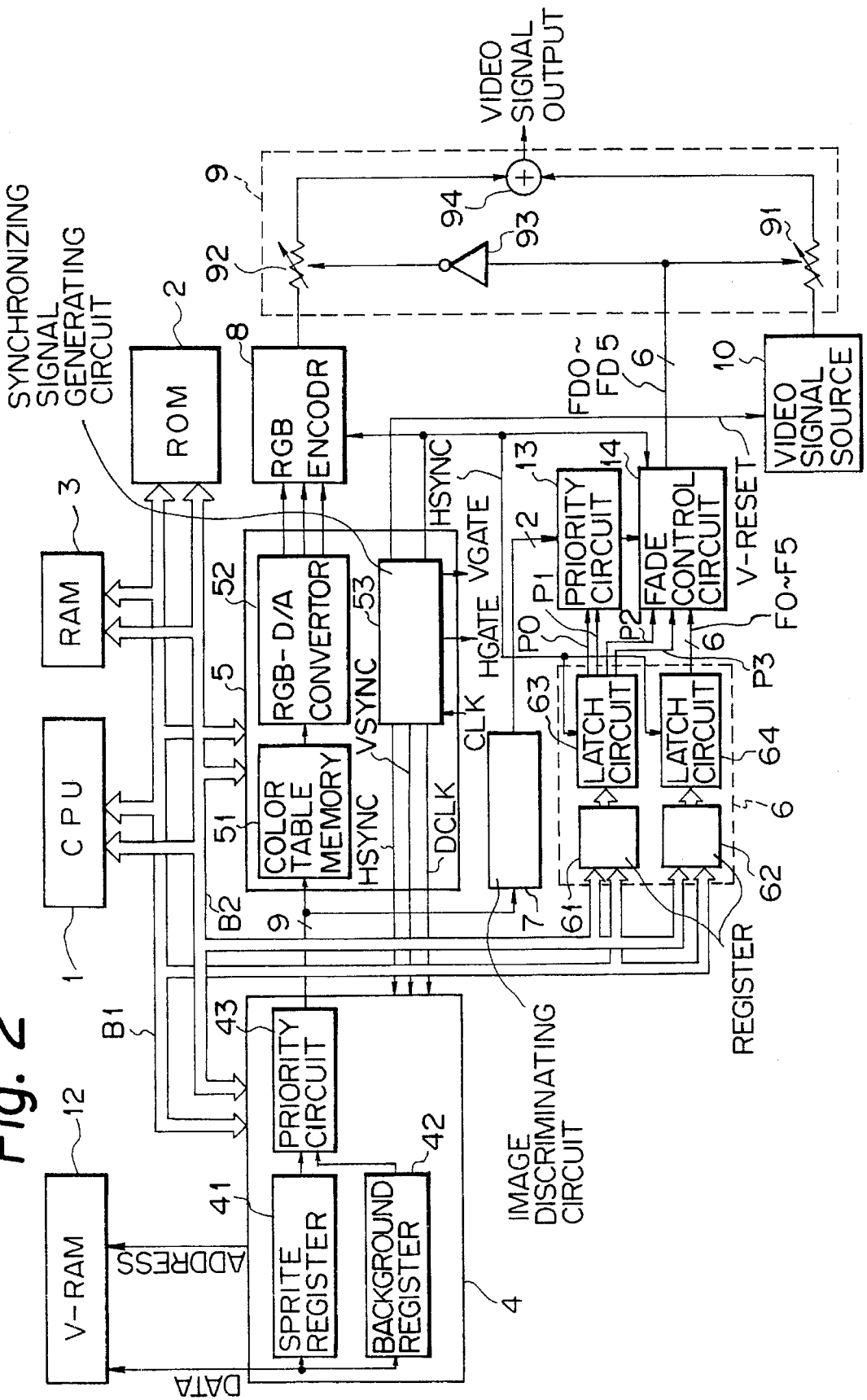
FIG. 2 is a block diagram showing an embodiment of the present invention.

FIG. 2 shows a video equipment to which an apparatus for mixing video signals according to the present invention is applied. The video equipment is provided with a common data bus B1 and a common address bus B2, to which connected are a CPU 1, a ROM 2, a RAM 3, a video display controller (VDC) 4, a video control encoder (VCE) 5, and a data selector 6. The CPU 1, which controls the whole video equipment, outputs instructions and data onto the buses B1, B2 in accordance with a program previously written in the ROM 2. The ROM 2, which is removably built in the video equipment, has previously stored therein one or a plurality of programs and data such as character data and fade data, possibly required to generate video images. The RAM 3 is used to temporarily store data read from the ROM 2 and processed data. The VDC 4 supplies image data to be stored in a V-RAM (video RAM) 12 for generating graphics images, writes data in the V-RAM 12, and reads and outputs necessary image data from the V-RAM 12, in accordance with the instruction from the CPU 1.

The VDC 4 is provided with a sprite register 41; a background register 42 and a priority circuit 43. The sprite register 41 holds on dot-by-dot basis 8-bit image data read from the V-RAM 12. The image data represent a character video image such as a person, a letter. The background register 42 holds on dot-by-dot basis 8-bit image data representing a background video image which is read from the V-RAM 12. The priority circuit 43 selectively outputs either of image data held in the registers 41 and 42 in the priority order indicated by a priority signal which is supplied from the CPU 1 to the priority circuit 43. The image data held in the sprite register 41 is used for a screen A for character video images within three screens for graphics images, while image data held in the background register 42 is used for one of two screens B, C for background images. As shown in FIG. 3, image data VD0–VD7 for the screen C are all zero, while image data VD0–VD7 for the screens A, B are not all zero but indefinite or different, as indicated by "X". The most significant bit VD8 is set to one for the screen A for character images and to zero for the screens B, C for background images. The bit VD8 is added to the image data when it is issued from each of the registers 41, 42. The image data, as a result, is issued in a 9-bit form from the VDC 4 to the VCE 5 and an image discriminating circuit 7. Incidentally, a specific structure of the VDC 4 is disclosed, for example, in Japanese Patent Application Kokai No. 64-78319.

The VCE 5 is provided with a color table memory 51, an RGB-D/A convertor circuit 52 and a synchronizing signal generating circuit 53. The color table memory 51 comprises a ROM forming a color table which has stored therein, for example, 256 colors of RGB data each indicative of a color tone corresponding to image data, and supplies the RGB-D/A convertor circuit 52 with RGB data which corresponds to image data issued from the VDC 4. The RGB-D/A convertor circuit 52 converts the RGB data thus supplied thereto to an analog RGB signal. The synchronizing signal generator circuit 53 comprises a divider, and divides a reference clock signal CLK to generate a horizontal synchronizing signal HSYNC and a vertical synchronizing signal VSYNC; a dot clock signal DCLK generated for each dot; and a horizontal gate signal HGATE and a vertical gate signal VGATE, each having a wider pulse width between the leading and trailing edges, the gate signals being produced from the horizontal synchronizing signal HSYNC and the vertical synchronizing signal VSYNC. The horizontal synchronizing signal HSYNC, the vertical synchronizing signal VSYNC and the dot clock signal DCLK are supplied to the VDC 4 as timing signals. The horizontal gate signal HGATE and the vertical gate signal VGATE are supplied to a fade control circuit 14, later referred to. Also, the synchronizing signal generator circuit 53 supplies the data selector 6 and an RGB encoder 8 with the horizontal synchronizing signal HSYNC, and also a video signal source 10 with a reset signal V-RESET corresponding to the vertical synchronizing signal VSYNC.

The analog RGB signal issued from the RGB-D/A convertor circuit 52 is supplied to the RGB encoder 8. The RGB encoder 8 converts the analog RGB signal to a composite video signal in accordance with the horizontal synchronizing signal HSYNC. The converted video signal is supplied to a mixer circuit 9 as a graphics video signal. The mixer circuit 9 comprises an attenuator (ATT) 91 for attenuating a play video signal from the video signal source 10 such as a video disc player; an attenuator (ATT) 92 for attenuating a graphics video signal from the encoder 8; an invertor 93 for inverting fade control data FD0–FD5 relayed by a fade control circuit 14, later referred to; and an adder 94 for adding video signals issued from the attenuators 91, 92. The attenuation degree provided by the ATT 91 varies in accordance with the fade control data FD0–FD5, while the attenuation degree provided by the ATT 92 varies in accordance with inverted data by the invertor 93. The output signals from the ATT's 91, 92 are supplied to a CRT display (not shown) through the adder 94. Incidentally, each of the ATT's 91, 92 is formed by a voltage controlled amplifier (VCA) disposed in the middle of a video signal line; and a D/A convertor for converting the fade control data or the inverted data to an analog signal and for supplying the analog signal to the VCA as a control voltage.

The data selector 6 comprises two registers 61, 62 and latch circuits 63, 64 connected to the registers, respectively. The register 61 is supplied with priority data and address data from the CPU 1 through the data bus B1 and the address bus B2. When the register 61 is designated by the address data, the priority data is held in the register 61. The priority data consists of four bits P0–P3. The bits P0, P1 serve as a priority table signal representative of the priority order of the screens A–C and the screen D for displaying an image produced by a play video signal from the video signal source 10. FIG. 4 shows the priority order corresponding to the bits P0, P1. The bit P2 indicates whether or not the priority order is reversed, and the bit P3 indicates whether a region without fading effect is created in a graphics video image or a play video image. These bits are supplied to change-over switches 14A–14F, later referred to, as 6-bit fade stop data. It should be noted the priority data is different from the priority signal supplied to the priority circuit 43.

The register 62 is supplied with fade data and address data from the CPU 1 through the data bus B1 and the address bus B2, respectively. When the register 62 is designated by the address data, the 6-bit fade data F0–F5 are held in the register 62. The data held in the registers 61, 62 are further held in corresponding latch circuits 63, 64 in accordance with the horizontal synchronizing signal HSYNC. The outputs of the latch circuits 63, 64 are connected to the priority circuit 13 and the fade control circuit 14.

The image discriminating circuit 7 discriminates whether the 9-bit image data supplied thereto corresponds to the screens A, B or C. The image discriminating circuit 7 comprises an OR circuit which takes a logical OR of bits VD0–VD7 in the image data VD0–VD8.

The 2-bit output of the OR circuit and the bit VD8 are delivered from the image discriminating circuit 7, which in turn serves as a control signal for the priority circuit 13.

Figure 5:
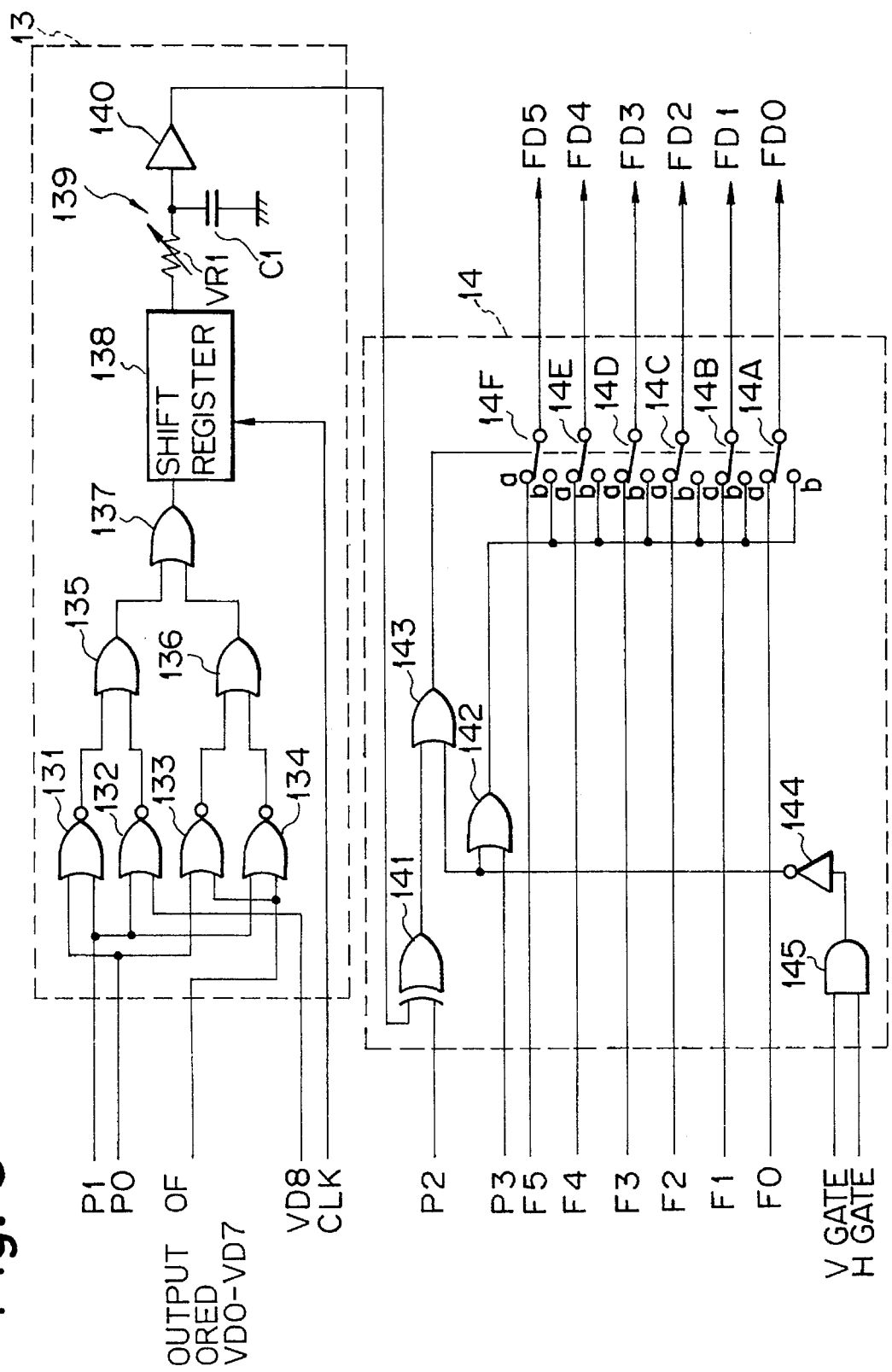
FIG. 5 is a block diagram concretely illustrating a priority circuit and a fade control circuit in the apparatus shown in FIG. 2.

The priority circuit 13 and the fade control circuit 14 are constructed as shown in FIG. 5. Specifically, the priority circuit 13 is provided with four NOR circuits 131–134; OR circuits 135–137; a shift register 138; an integrating circuit 139 formed by a variable resistor VR1 and a capacitor C1; and a buffer amplifier 140 for waveform shaping. The NOR circuit 131 takes a logical NOR of the bits P0 and P1 of the priority data; the NOR circuit 132 a negative logical OR of the bit VD8 as it is, i.e., the output of the image discriminating circuit 7, and the bit P1; the NOR circuit 133 a logical NOR of the bit P0 and the OR output of the bits VD0–VD7 from the image discriminating circuit 7; and the NOR circuit 134 a logical NOR of the bit P1 and the OR output of the bits VD0–VD7 from the image discriminating circuit 7. The OR circuit 135 takes a logical OR of the respective outputs of the NOR circuits 131, 132; the OR circuit 136 a logical OR of the respective outputs of the NOR circuits 133, 134; and the OR circuit 137 a logical OR of the respective outputs of the OR circuits 135, 136. The logic circuits thus constructed causes the OR circuit 137 to present a high level output indicative of "1" when the screen D for play video images has the highest priority and a low level output indicative of "0" when either of the screen A–C for graphics video images takes the priority over the screen D. Thus, the output of the OR circuit 137 serves as a video image selecting signal indicating which of play video images and graphics images should be displayed on preferential basis. The shift register 138 counts the reference clock signal CLK to delay the output signal of the OR circuit 137 by a predetermined time period. An output signal of the register 138 is supplied to the buffer amplifier 140 through the integrating circuit 139. The shift register 138, the integrating circuit 139 and the buffer amplifier 140 are provided for the positioning of respective video images, where an output signal of the buffer amplifier 140 is supplied to the fade control circuit 14 as a signal which has delayed the video image selecting signal. It will be appreciated that the resistance value of the variable resistor VR1 in the integrating circuit 139 may be manually changed.

The fade control circuit 14 is provided with an exclusive-OR (EX-OR) circuit 141; OR circuits 142, 143; an invertor 144; an AND circuit 145; and six change-over switches 14A–14F. The EX-OR circuit 141 takes an exclusive OR of the output of the shift register 138 and the bit P2 of the priority data, and its output is supplied to the change-over switches 14A–14F through the OR circuit 143 as a change-over control signal therefor. The OR circuit 142 is supplied with the bit P3 of the priority data, and supplies its output to a fixed contact b of the respective change-over switches 14A–14F. A fixed contact a of the respective change-over switches 14A–14F is supplied with each bit F0–F5 of the fade data in the order. The AND circuit 145 is supplied with the horizontal gate signal HGATE and the vertical gate signal VGATE, and presents an output at low level when either of those signals is generated. The output signal of the AND circuit 145 is supplied to the OR circuit 142 as well as to the OR circuit 143 through the invertor 144. Upon generating the horizontal gate signal HGATE and the vertical gate signal VGATE, the change-over switches 14A–14F are forced to position at the fixed contact b such that the horizontal synchronizing signal HSYNC and the vertical synchronizing signal VSYNC are free from influences of the fade operation. Relay outputs of the change-over switches 14A–14F are supplied to the mixer circuit 9.

In the above structure, the CPU 1 first reads color data indicative of a displayed color and character data representing a person or the like from the ROM 2 in accordance with a program stored in the ROM 2, and supplies the read data together with address data to the VDC 4. The VDC 4 stores each of the supplied data at a storing location in the V-RAM 12 designated by the address data.

In the VDC 4, a pattern number and a sprite color, stored in a sprite attribute table buffer, not shown, are read therefrom, and on the basis of them, color data and character data are read from their stored locations in the V-RAM 12 and held in the sprite register 41 as image data for one dot. Also, address data is derived from a raster position, and subsequently color data and character data are derived from the V-RAM 12 at locations corresponding to the address data. Further, data is taken out of an address location determined by the character data, which is held together with the color data in the background register 42 as image data for one dot. The image data VD0–VD7 held in the sprite register 41 and the background register 42 are updated or changed any time, for example, every time the dot clock is generated. Since the operations performed for the data transfer between the VDC 4 and the V-RAM 12 is specifically disclosed in the aforementioned Japanese Patent Application Kokai No. 64-78319, detailed explanation on the operation thereof will be omitted here.

The CPU 1 generates a priority signal every time the dot clock signal DCLK is generated in accordance with a program stored in the ROM 2. The priority circuit 43 selectively outputs one of image data held in the registers 41, 42 in the priority order indicated by the priority signal. Since one bit VD8, the value of which is previously determined for the screens A, B or C, is added to the image data when it is issued from the register 41 or 42, the selected image data includes nine bits VD0–VD8 which are issued from the priority circuit 43 on dot-by-dot basis.

The image data issued from the VDC 4 is converted to corresponding RGB data by the color table in the color table memory 51, and thereafter is further converted to an analog RGB signal by the RGB-D/A convertor circuit 52. The RGB signal is supplied to the mixer circuit 9 through the RGB encoder 8 as a graphics video signal.

In addition, the CPU 1 properly supplies the data selector 6 with the fade data F0–F5 or the priority data P0–P3 and address data, in accordance with a program stored in the ROM 2. When the register 61 is designated by the address data, the priority data P0–P3 is held in the register 61. If the priority data has already been held in the register 61, it is updated or replaced by the newly supplied priority data P0–P3. The latch circuit 63 is supplied with the horizontal synchronizing signal HSYNC, so that the latch circuit 63 receives the priority data P0–P3 held in the register 61 in response to a rising edge of the horizontal synchronizing signal HSYNC, and updates and holds the priority data at the time the HSYNC rises.

Figures 6A, 6B, 6C:
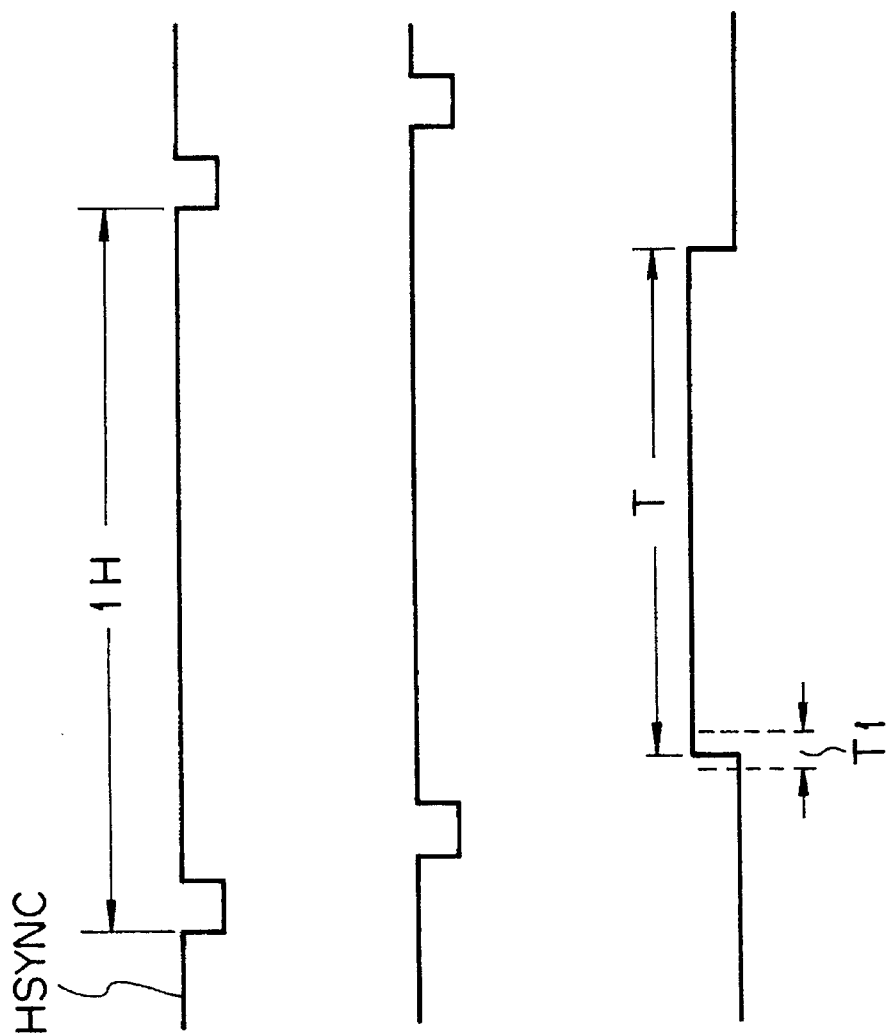
FIG. 6(a) shows the waveform of a horizontal synchronizing signal HSYNC.
FIG. 6(b) shows how a color burst signal is generated.
FIG. 6(c) shows a period T during which an image is actually displayed on the screen of a CRT display.

When the horizontal synchronizing signal HSYNC is generated as shown in FIG. 6(a), FIG. 6(b) shows how a color burst signal is generated, and FIG. 6(c) shows a period T during which an image is actually displayed on the screen of the CRT display. FIG. 7 illustrates in enlarged view changes of the priority data in a portion of the period T in FIG. 6. Specifically, FIG. 7(a) shows the dot clock signal DCLK; FIG. 7(b) the horizontal synchronizing signal, similarly to that shown in FIG. 6(a); FIG. 7(c) a timing at which data held in the register 61 is updated by the priority data P0–P3 supplied from the CPU 1; and FIG. 7(d) a data update timing for the latch circuit 53 at a rising edge of the horizontal synchronizing signal HSYNC. More specifically, data equal to the priority data P0–P3 held in the register 61 for a period indicated by hatching in FIG. 7(c) is held in the latch circuit 63 for a period indicated by hatching in FIG. 7(d).

When the register 62 is designated by the address data, the fade data F0–F5 is held in the register 62. In a manner similar to the case of the priority data, if previous fade data F0–F5 has already been held in the register 62, it is updated by the newly supplied fade data F0–F5. The latch circuit 64 is supplied with the horizontal synchronizing signal HSYNC, so that the latch circuit 64 receives the fade data F0–F5 held in the register 62 in response to a rising edge of the horizontal synchronizing signal HSYNC, and updates and holds the held data by the supplied data at the time the horizontal synchronizing signal HSYNC rises. The fade data held in the latch circuit 64 is supplied to a fixed contact a of the respective change-over switches 14A–14F.

The image discriminating circuit 7 discriminates the screens A, B, C on the basis of the image data issued from the VDC 4, and supplies the priority circuit 13, as the discrimination result, with a 2bit signal consisting of the OR output of the image data bits VD0–VD7 and the most significant bit VD8. For example, if the most significant bit VD8 of the image data issued from the VDC 4 changes as shown in FIG. 7(e), and the OR output of the bits VD0–VD7 changes as shown in FIG. 7(f) for each dot, the image discriminating circuit 7 discriminates the screens A, B, C as shown in FIG. 7(g).

The priority circuit 13 determines, for each dot, which of the screens A–D should be preferentially displayed in accordance with the bits P0, P1 of the priority data, and the OR output of the bits VD0–VD7 and the most significant bit VD8 of the image data. Specifically, the OR output of the bits VD0–VD7 and the most significant bit VD8 indicate that new image data currently being issued from the VDC 4 is associated with one of the screen A–C, it is determined from the contents of the bits P0, P1 which of the one screen for graphics video images and the screen D for play video images is to be preferentially displayed. For example, with P0=0 and P1=0, the screen D is preferentially displayed irrespective of a screen indicated by the image data issued from the VDC 4 being the screen A, B or C, as can be seen from FIG. 4. With P0=1 and P1=0, if a screen indicated by the issued image data is the screen A, the screen A has the priority over the screen D. Also, with P0=0 and P1=1, if a screen indicated by the issued image data is the screen B, the screen B has the priority over the screen D. Thus, the output level of the OR circuit 137 becomes low when a graphic video image G on any of the screens A–C is preferentially displayed, and becomes high when a play video image P on the screen D is preferentially displayed, as shown in FIG. 7(j). Incidentally, FIG. 7(h) shows a state where the bit P1 maintains "0", and FIG. 7(i) shows a state where the bit P0 is inverted from "0" to "1" at the time the horizontal synchronizing signal HSYNC rises.

The video image selecting signal or the output signal of the OR circuit 137 is delayed by the shift register 138 and the integrating circuit 139, and the delayed signal is waveform shaped by the buffer amplifier 140, an output signal of which is supplied to the fade control circuit 14.

The bit P2 of the priority data becomes "1" when the display priority order is reversed, and "0" when not. When the gate signals HGATE and VGATE are not generated while the bit P2 is equal to "0", the output signal of the priority circuit 13 is supplied to the change-over switches 14A–14F through the EX-OR circuit 141 and the OR circuit 143 without its level being inverted. When the gate signals HGATE and VGATE are not generated while the bit P2 is equal to "1," the output signal of the priority circuit 13 has its level inverted by the EX-OR circuit 141, and then is supplied to the change-over switches 14A–14F through the OR circuit 143. The change-over switches 14A–14F are switched to the fixed contact b when the output of the OR circuit 143 is at high level, thus relaying the bit P3 of the priority data as the 6-bit fade control data FD0–FD5 (all of the bits are "0" or "1"). On the other hand, when the output of the OR circuit 143 is at low level, the change-over switches 14A–14F are switched to the fixed contact a, thus relaying the fade data F0–F5 held in the latch circuit 64 as the fade control data FD0–FD5 to the mixer circuit 9.

In the mixer circuit 9, the attenuation degree of the ATT 91 for attenuating play video signals varies in accordance with the fade control data FD0–FD5, while the attenuation degree of the ATT 92 for attenuating graphics video signals varies in accordance with the inverted data provided by the invertor 93. If the fade control data FD0–FD5 presents "00000" indicative of a fully transparent state, the attenuation degree of the ATT 92 is minimal, while that of the ATT 91 is maximal, whereby graphics video signals are issued as they are from the mixer circuit 9. Conversely, if the fade control data FD0–FD5 presents "111111" indicative of an opaque state, the attenuation degree of the ATT 92 is maximal while that of the attenuator 91 is minimal, whereby play video signals are issued as they are from the mixer circuit 9. Thus, as the fade control data FD0–FD5 indicates more transparency, the attenuation degree of the ATT 91 is increased, while the attenuation degree of the ATT 92 is decreased. As the transparency is larger, more graphics images are superimposed on play video images. Output signals of the ATT's 91, 92 are supplied to the CRT display through the adder 94, whereby a video image including graphics images superimposed on play video images such as a moving picture is displayed on the screen of the CRT display. In the video image thus displayed, the mixture of the play video images and the graphic images change every line at the maximum on a single screen.

When the output of the priority circuit 13 is at high level, if the gate signals HGATE and the VGATE are not generated while P2 is equal to "0," the screen D, i.e., the screen for play video images is given the priority, so that the change-over switches 14A–14F relay the bit P3 of the priority data as the 6-bit fade control data FD0–FD5. In this manner, one of the play video signal and the graphics video signal is issued in accordance with the bit P3 of the priority data. For example, if P3=0, the video signal is issued from the mixer circuit 9 as it is in conformity with the priority order. If P3=1, the graphics video signal is issued from the mixer circuit 9 as it is. On the other hand, when the output of the priority circuit 13 is at low level, if the-gate signals HGATE and VGATE not generated while P2 is equal to "0," one of the screens A–C is preferentially displayed, so that the change-over switches 14A–14F relay and output the fade data F0–F5, whereby the play video signal and the graphics video signal are mixed in a mixing ratio according to the fade data F0–F5.

If the gate signals HGATE and VGATE are not generated while P2 is equal to "1," the priority order is reversed. Therefore, when the output of the priority circuit 13 is at high level, the play video signal and the graphics video signal are mixed in a mixing ratio according to the fade data F0–F5. Conversely, when the output of the priority circuit 13 is at low level, one of the play video signal and the graphics video signal is issued in accordance with the bit P3 of the priority data.

When the gate signal HGATE or VGATE is generated, the output of the AND circuit 145 is at low level, so that the low level output is inverted to a high level signal by the invertor 144 and supplied to the OR circuit 143. Thus, the output of the OR circuit 143 is at high level, irrespective of the output level of the priority circuit 13, whereby the bit P3 of the priority data is relayed to the mixer circuit 9 as the 6-bit fade control data FD0–FD5.

Next, explanation will be given of a method of adjusting a variable resistor VR1 for the positioning of video images.

In this case, used as the ROM 2 is one including test data recorded therein. The CPU 1, after issuing a test start instruction, reads color data indicative of a display color and character data from the ROM 2 in accordance with a test program stored in the ROM 2, and supplies the read data to the VDC 4 together with address data associated therewith. The VDC 4 stores each supplied data at a storing location in the V-RAM 12 designated by the address data corresponding thereto. Thereafter, the CPU 1 commands the VDC 4 to read data from the V-RAM 12 every time the dot clock signal DCLK is generated, in accordance with the test program, and hold image data for testing in the register 41. The CPU 1 also generates a priority signal indicative of A>B>C. Since the priority circuit 43 gives the priority to the screen A, as is indicated by the priority signal, the image data for testing held in the register 41 is issued. The image data for testing displays a single color after a predetermined number of dots have been displayed from the generation of the horizontal synchronizing signal HSYNC in every horizontal period 1H.

Figures 8A, 8B, 8C:
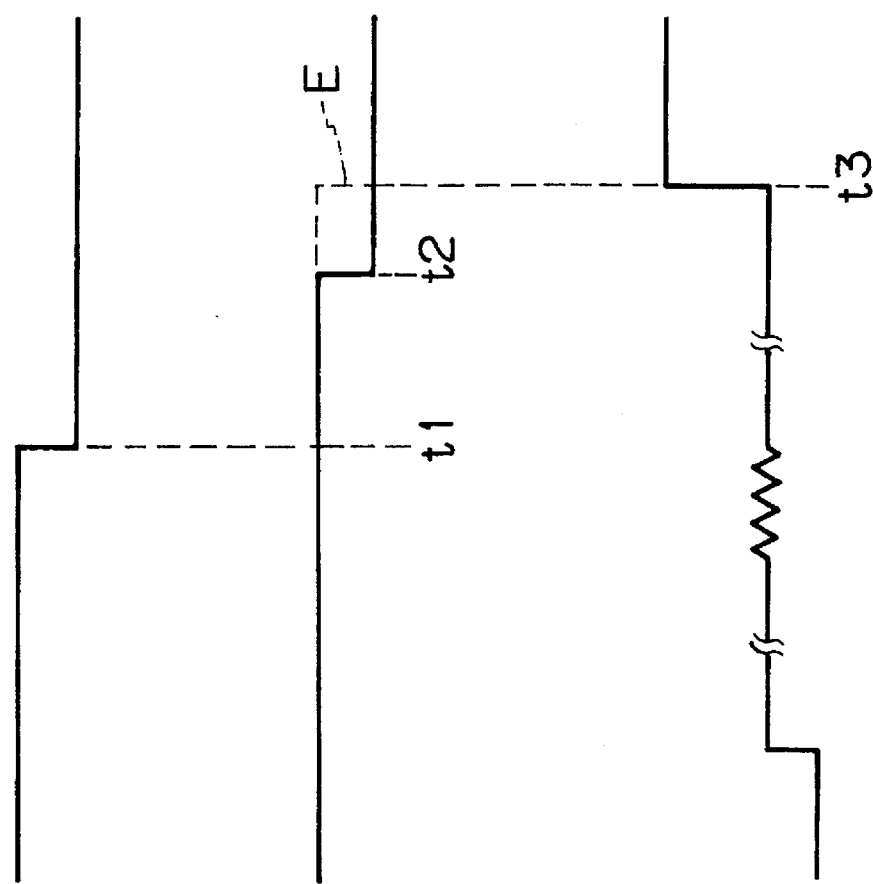
FIGS. 8(a)–8(c) show the operating states of respective portions in the apparatus of FIG. 2.

Since data indicative of P0=1 and P1=0 is supplied to the image discriminating circuit 7 as the priority data, if the priority circuit 13 is supplied with image data (actually, the OR output of the bits VD0–VD7 and the bit VD8) indicative of the screen A in 1H, the output level of the OR circuit 137 falls in response to the image data, as shown in FIG. 8(a). If the falling time of the output of the OR circuit 137 is designated t1, the output is delayed by the shift register 138 and the integrating circuit 139 before it is supplied to the buffer amplifier 140, so that the output of the buffer amplifier 140 becomes low at a falling time t2 as shown in FIG. 8(b). The graphic video signal derived from the RGB encoder 8 in turn presents a waveform as shown in FIG. 8(c), where signal components related to the image data for testing on the screen A rises at a time t3. The difference between the times t3 and t1 is substantially equal to a time period necessary to output the graphics video signal from the VCE 5 through the RGB encoder 8 for the image data for testing. Thus, the operator observes the signal waveforms shown in FIGS. 8(b) and 8(c) and manipulates the variable register VR1 so as to coincide the falling time t2 with the time t3 as indicated by the broken line E for setting a delay time provided by the integrating circuit 139. In this manner, the graphics video signal and the fade data can be simultaneously supplied to the mixer circuit 9 for single image data, making it possible to appropriately adjust the positions of graphics video images and play video images.

Figure 1:
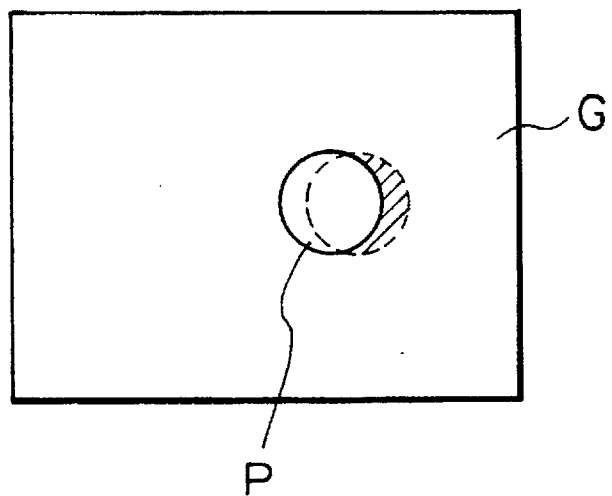
FIG. 1 is a diagram showing a positional difference between a graphics video image and a play video image.
Figure 9:
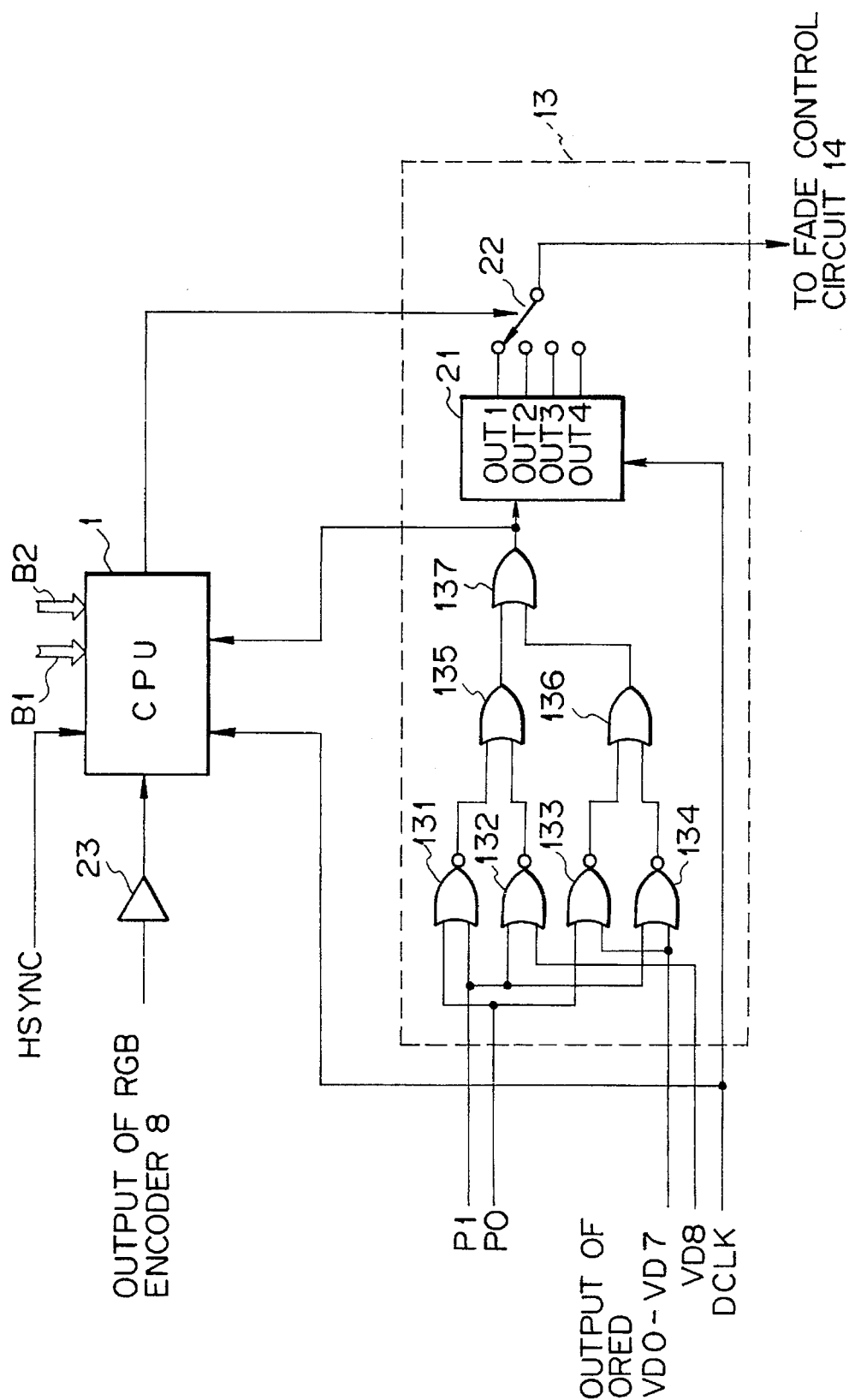
FIG. 9 is a block diagram illustrating another embodiment of the present invention.

FIG. 9 shows another embodiment of the present invention which is capable of automatically performing appropriate positioning of graphics video images, and play video images. In the priority circuit 13 of the apparatus shown in FIG. 9, the output of the OR circuit 137 is connected to a shift register 21. The shift register 21 counts the dot clock signal DCLK to obtain four different delay times DL1–DL4 and delays a signal supplied from the OR circuit 137 by the delay times DL1–DL4, respectively, and outputs the delayed signals from output terminals OUT1–OUT4, respectively. For example, the delay time DL1 is set to 480 nsec; DL2 to 490 nsec; DL3 to 500 nsec; and DL4 to 510 nsec. Arranged on the output side of the shift register 21 is a change-over switch 22 which selectively relays one of output signals from the output terminals OUT1–OUT4 to the fade control circuit 14. The change-over switch 22 is supplied with a switch control signal from the CPU 1. Also, the apparatus of this embodiment is provided with a comparator 23 which is supplied with an output video signal from the RGB encoder 8, i.e., a graphics video signal. The comparator 23 generates a high level signal when the graphics video signal presents a level equal to or higher than a predetermine value. This predetermined value is set slightly lower than a graphic video signal component level issued from the RGB encoder 8 for the image data for testing. The CPU 1 is supplied with the synchronizing signal HSYNC, the dot clock signal DCLK, the output signal of the comparator 23, and the output signal of the OR circuit 137, in addition to data supplied through the buses B1 and B2 shown in FIG. 1. The rest of the structure is similar to those shown in FIGS. 2 and 5.

Figure 10:
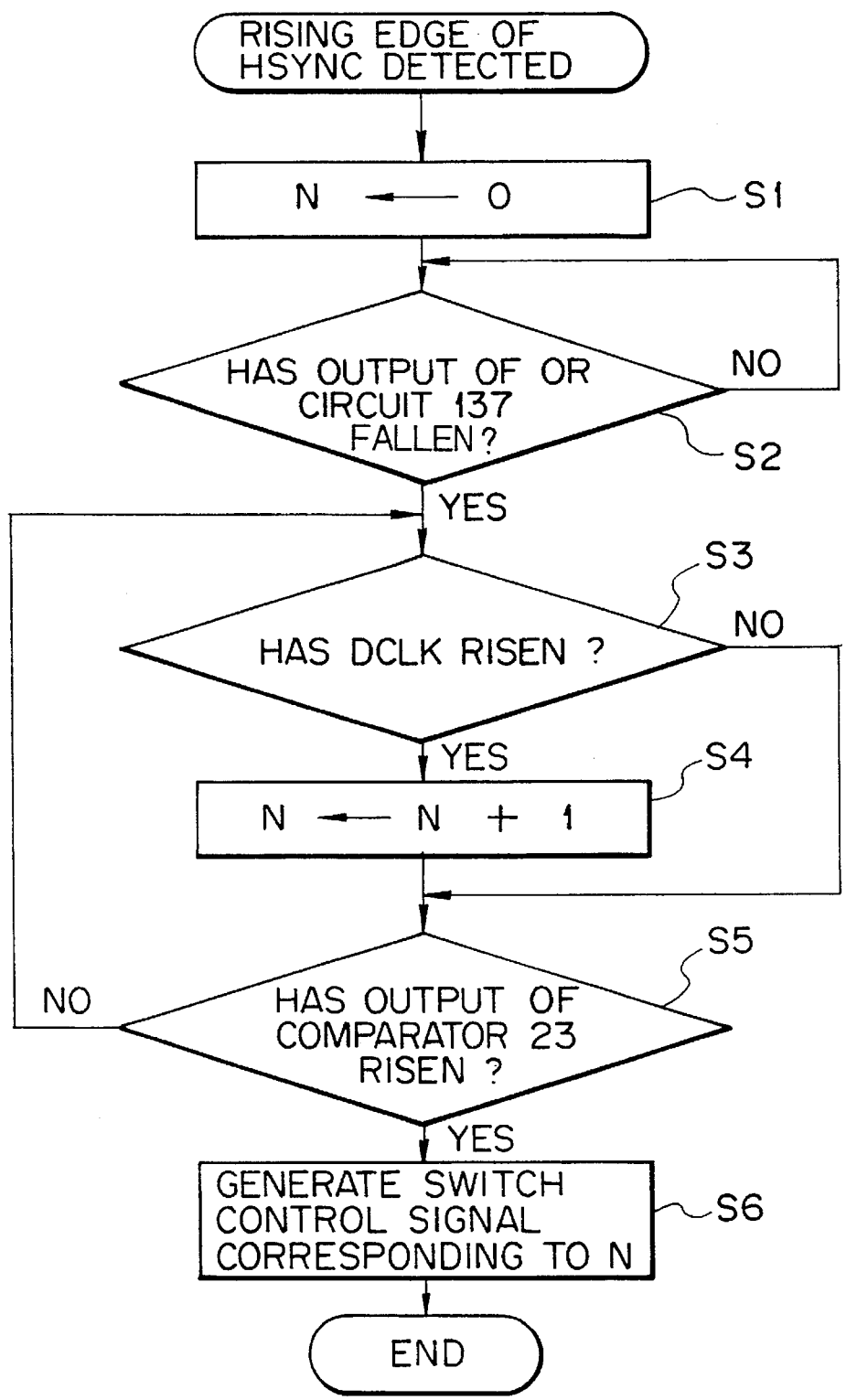
FIG. 10 is a flowchart illustrating the operation of a CPU in the apparatus shown in FIG. 9.
Figures 11A, 11B, 11C, 11D, 11E:
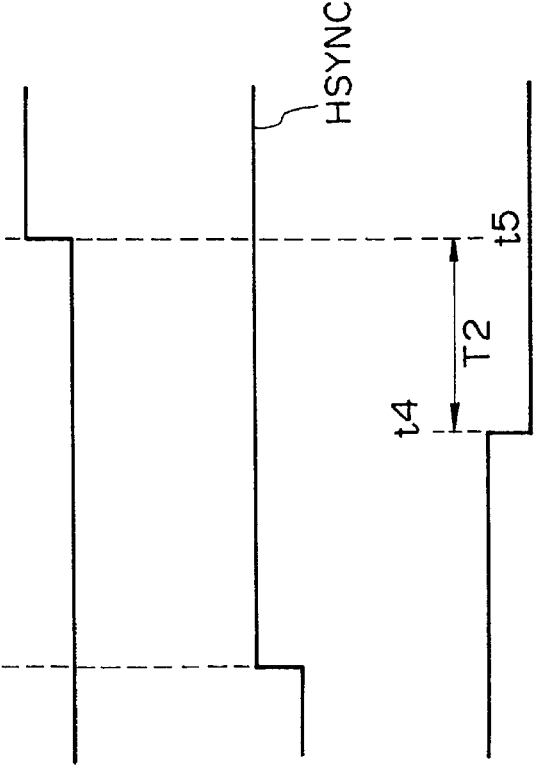
FIGS. 11(a)–11(e) show the operating states of respective portions in the apparatus of FIG. 9.

The apparatus of the embodiment also employs the ROM 2 including test data recorded therein, and outputs image data for testing indicative of the screen A from the VDC 4 in every 1H, after generating a test start instruction, similarly to the case for the method of adjusting the variable register VR1 as described above. The CPU 1, after generating the test start instruction, keeps monitoring the horizontal synchronizing signal HSYNC to rise by an interrupt operation. When the horizontal synchronizing signal HSYNC rises as shown in FIG. 11(c), the CPU 1 detects the same and executes a routine shown in FIG. 10.

In the routine, the CPU 1 first resets a count value N to 0 (step S1), and determines whether or not the output signal level of the OR circuit 137 has fallen (step S2). The output signal of the OR circuit 137 having fallen as shown in FIG. 11(d) means that the image data for testing has been supplied. Then, it is determined whether or not the dot clock signal DCLK (FIG. 11(e)) has risen (step S3). If the dot clock signal DCLK has risen, the count value N is incremented by one (step S4). After executing step S4, it is determined whether or not the output signal of the comparator 23 has risen (step S5). When it is determined at step S3 that the dot clock signal DCLK has not risen, step S5 is also executed. If the output signal of the comparator 23 remains at low level, the CPU 1 returns to the execution of step S3. On the other hand, with the graphic video signal being at a level equal to or more than the predetermined value as shown in FIG. 11(a), if the output signal of the comparator 23 has risen as shown in FIG. 11(b), it means that graphics video signal components corresponding to the image data for testing were issued from the encoder 8. Therefore, the count value N at that time indicates a time length T2 from a falling time t4 of the output signal of the OR circuit 137 to a rising time t5 of the output signal of the comparator 23. Then, the CPU 1 generates a switch control signal corresponding to the count value N (step S6). For example, if the count value N ranges from 0 to 2, the CPU 1 generates the switch control signal such that the output terminal OUT1 is selected by the switch 22; if from 3 to 4 the output terminal OUT2; if from 5 to 6 the output terminal OUT3; and if 7 or more the output terminal. OUT4. In this manner, an appropriate delay time is provided in response to the output signal of the priority circuit 13, whereby the time difference t5–t4 is automatically decreased, thus finishing the video image positioning test.

It should be noted that the image data for testing may be generated by an instruction input by manipulating keys provided in the apparatus, and alternatively it may be automatically generated at a timing previously set in the CPU 1 by a program recorded in the ROM 2.

The video image positioning test may also be automatically started upon powering up the video equipment, in a constant time after exchanging the ROM 2, during a pause state of the video equipment, and so on.

The ROM 2 may not be one dedicated for the test program but one which has the test program previously stored therein together with objective programs for graphics video images. Further, the ROM 2 is not limited to a memory device but may take the form of a recording medium such as CD-ROM. Although in the foregoing embodiment, a removable ROM 2 has been shown, a ROM including test data recorded therein may be mounted in the apparatus.

As described above, in the apparatus for mixing video signals of the present invention, a video image selecting signal generated on the basis of image data issued from a data output means is delayed by a delay means, a delay time of which is made adjustable. By forcing the data output means to output image data for testing, the delay time of the delay means can be manually or automatically adjusted so as to coincide a time at which the video image selecting signal is generated based on the image data for testing with a time at which the image data for testing is converted to a graphics video signal and issued from a converting means. It is therefore possible to perform appropriate alignment of synthesized graphics video images and play video images in a single screen, even if a time necessary for the encoder to generate the graphics video signal for image data is different from a time necessary to select the kind of image.

What is claimed is:

1. An apparatus for mixing a play video signal derived by playing a recording medium with a graphics video signal derived on the basis of the results of processing performed by data processing means, comprising:

data generating means for generating image data on a pixel-by-pixel basis;

converting means for converting image data generated from said data generating means to said graphics video signal;

video image discriminating means for discriminating, on the basis of the image data generated from said data generating means, which of a video image represented by said play video signal and a video image represented by said graphics video signal is to be displayed and for generating a video image selecting signal indicative of the discrimination result;

delay means for delaying said video image selecting signal in order to eliminate a difference between a time necessary to generate said graphics video signal in said converting means and a time necessary to generate said video image selecting signal in said video image discriminating means;

mixing means for mixing said play video signal with said graphics video signal in accordance with the video image selecting signal issued from said delay means;

means for controlling said data generating means in order to generate an image data for testing;

means for detecting a time at which the video image selecting signal is issued from said video image discriminating means corresponding to said image data for testing issued from said data generating means and for generating a first detecting signal;

means for detecting a time at which a graphics video signal is issued from said converting means in response to said image data for testing and for generating a second detecting signal;

counting means for counting a time length from a time at which said first detecting signal is generated to a time at which said second detecting signal is generated; and control means for changing the delay time of said delay means in accordance with the counting result of said counting means.

* * * * *